(12) United States Patent
Peng et al.

(10) Patent No.: US 12,741,245 B2
(45) Date of Patent: Sep. 22, 2026

(54) DUST REMOVAL FILLER, FOULING COLLECTION PAN AND GAS CLEANING DEVICE

(71) Applicants: CHINA PETROLEUM & CHEMICAL CORPORATION, Beijing (CN); SINOPEC DALIAN RESEARCH INSTITUTE OF PETROLEUM AND PETROCHEMICALS CO., LTD., Dalian (CN)

(72) Inventors: Deqiang Peng, Dalian (CN); Minghua Guan, Dalian (CN); Ping Jin, Dalian (CN); Xiangcheng Liang, Dalian (CN); Xiuna Yang, Dalian (CN); Ying Yu, Dalian (CN); Zonglin Ruan, Dalian (CN)

(73) Assignees: CHINA PETROLEUM & CHEMICAL CORPORATION, Beijing (CN); SINOPEC DALIAN RESEARCH INSTITUTE OF PETROLEUM AND PETROCHEMICALS CO., LTD., Dalian (CN)

( * ) Notice: Subject to any disclaimer, the term of this patent is extended or adjusted under 35 U.S.C. 154(b) by 508 days.

(21) Appl. No.: 18/245,573

(22) PCT Filed: Sep. 16, 2021

(86) PCT No.: PCT/CN2021/118696
§ 371 (c)(1),
(2) Date: Mar. 16, 2023

(87) PCT Pub. No.: WO2022/057853
PCT Pub. Date: Mar. 24, 2022

(65) Prior Publication Data

US 2023/0364545 A1 Nov. 16, 2023

(30) Foreign Application Priority Data

Sep. 17, 2020 (CN) ........................ 202010978766.2
Sep. 17, 2020 (CN) ........................ 202010980136.9
Sep. 17, 2020 (CN) ........................ 202010982283.X

(51) Int. Cl.
*B01D 46/00* (2022.01)
*B01D 46/12* (2022.01)
*B01D 46/48* (2006.01)
*B01J 8/00* (2006.01)
*B01J 8/02* (2006.01)
*B01D 45/08* (2006.01)

(52) U.S. Cl.
CPC ............ *B01D 46/12* (2013.01); *B01D 46/48* (2013.01); *B01J 8/006* (2013.01); *B01J 8/0242* (2013.01); *B01D 45/08* (2013.01)

(58) Field of Classification Search
CPC ........ B01D 46/12; B01D 46/48; B01D 45/08; B01D 46/0043; B01D 46/52; B01D 46/62;
(Continued)

(56) References Cited

U.S. PATENT DOCUMENTS 1,899,498 A 2/1933 Fedeler
2,182,862 A 12/1939 Allardice
(Continued)

FOREIGN PATENT DOCUMENTS

AU 2007231896 A1 5/2008
CN 1765478 A 5/2006
(Continued)

*Primary Examiner* — T. Bennett Mckenzie
(74) *Attorney, Agent, or Firm* — NKL Law; Allen Xue

(57) ABSTRACT

A gas purification system includes a dust removal filler, a fouling collection pan and a gas purification device. The dust removal filler has a plurality of rows of channels, each channel extending obliquely with respect to a vertical direc-
(Continued)

tion to form a windward surface, and a leeward surface, and a waveform plate. The peak portion of the waveform plate is attached to the leeward surface of the obliquely prismatic channel. During operation, dust adheres to a concave portion of a lower surface of the waveform plate and accumulates to form dust aggregates. When the gravity of the dust aggregates is greater than the adhesion force, the dust aggregates fall onto the windward surface of the channels and slide off from the windward surface of the channels.

5 Claims, 11 Drawing Sheets

(58) Field of Classification Search
CPC .... B01D 50/20; B01D 46/0039; B01D 46/42; B01D 46/682; B01J 8/006; B01J 8/0242; B01J 8/1872
USPC .......................................................... 55/301
See application file for complete search history.

(56) References Cited

U.S. PATENT DOCUMENTS

| | | | | |
|---|---|---|---|---|
| 2,252,242 | A | 8/1941 | Wood | |
| 3,237,386 | A | 3/1966 | Farr et al. | |
| 3,702,527 | A | 11/1972 | Frew | |
| 4,402,829 | A | 9/1983 | Cordua | |
| 6,524,488 | B1 * | 2/2003 | Insley | B01D 39/1692 210/488 |
| 7,033,556 | B1 | 4/2006 | Squires | |
| 2004/0112213 | A1 * | 6/2004 | Dominiak | B01D 53/0446 96/135 |
| 2011/0226693 | A1 | 9/2011 | Andoh et al. | |

FOREIGN PATENT DOCUMENTS

| | | | | |
|---|---|---|---|---|
| CN | 101596400 | A | | 12/2009 |
| CN | 203043962 | U | | 7/2013 |
| CN | 209689470 | U | | 11/2019 |
| CN | 210278651 | U | * | 4/2020 |
| CN | 210613229 | U | | 5/2020 |
| CN | 111643968 | A | | 9/2020 |
| DE | 1619832 | A1 | | 3/1971 |
| GB | 1094617 | A | | 12/1967 |
| JP | 2007075672 | A | | 3/2007 |
| RU | 1782634 | A1 | | 12/1992 |
| RU | 172247 | U1 | | 7/2017 |
| TW | 352007 | U | | 2/1999 |
| TW | 201623606 | A | | 7/2016 |
| TW | 202010565 | A | | 3/2020 |

* cited by examiner

DUST REMOVAL FILLER, FOULING COLLECTION PAN AND GAS CLEANING DEVICE

TECHNICAL FIELD

The invention relates to the technical field of chemical engineering, and more specifically relates to a dust removal filler, a fouling collection pan and a gas purification device.

BACKGROUND

Process gases are generated in most chemical processes, and due to various industrial processes, these gases contain a large amount of dust/particulate matter, which are suspended in the air and have a serious impact on human health, life and production. With the enhancement of environmental protection regulations on emission standards, it is necessary to remove solid particles in these gases and/or purify them before being discharged into the environment. For example, fly ash must be removed from the flue gas generated during the production process of a coal-fueled power plant before it leaves the chimney. The solid dust entrained in the gas generated in the chemical production process will cause fouling and blockage of the device, which seriously restricts the long-term stable operation of the device. The dust entrained in these gases has good adhesion and aggregation property. The adhesion property of dust refers to the attractive force generated between different molecules, such as the adhesion between powder particles and the wall; the aggregation property of dust refers to the attractive force generated between the same molecules, for example, adhesion occurs between powder particles, to form aggregates. Dust adhesion and aggregation property are related to the nature of dust and the state of gas motion. Generally, the adhesion phenomenon is more likely to occur when the dust is small in particle size, irregular in shape, rough in surface, high in moisture content, excellent in wettability and large in charge. For the dust formed in the coal chemical process, due to the three mineral elements of Fe, Na, and Ca, as well as factors such as small particle size and large specific surface area of the dust, the dust has excellent adhesion property. The adhesion and aggregation property of dust are mainly caused by molecular force (Van Der Waals force) and electrostatic force (Coulomb force) in the dry state, and in the wet state mainly rely on the presence of moisture on the dust surface to form a liquid bridge or a solid bridge.

At present, there are many mature technologies for dust removal and purification of chemical gases, such as mechanical dust removal, wet dust removal, bag dust removal, electric dust removal and electrostatic bag composite dust removal and so on. (1) Mechanical dust removal technology is a method of dust removal using mechanical devices such as dust suppression chambers and cyclone separators. This method has better effect on dust with larger particles. However, for particles of about 2 μm that cause haze pollution, the purification efficiency is very low, and for fine particles, secondary dust-up problem of this type of dust removal device is serious, cannot play an effective role in the current situation where the dust removal efficiency of fine particles is getting higher and higher. (2) Wet dust removal technology is a method of dust removal using spray towers, water film dust collectors or Venturi dust collectors. It is commonly used in the treatment of gases with large particle sizes such as mote. The captured particles can be exhausted by forming mud with water. This method has high requirements on device, large device volume, high investment, and brings about the problem of mud waste liquid treatment. (3) The dust removal efficiency of the bag dust removal technology is very high, and it has good tolerance to the fluctuation of the particle size range of the dust, and can successfully obtain a high retention rate for even fine dust. However, pressure drop of the bag dust removal technology is relatively large, and dynamic load requirements for gas transmission device such as fans are high. In addition, the current common cloth bags are difficult to withstand high temperature. For the sintering flue gas containing red hot particles and smoldering particles in the exhaust gas, "burning bag" accidents often occur when using cloth bag dust removal. (4) Electric dust removal technology is also a very common and efficient dust removal method at present. The method first charges the dust in the gas, and then removes it from the gas flow by electric field force and fixes it on the surface of the electrode plate. This method can be used for high-temperature exhaust gas treatment, and has only a small pressure drop and resistance, but its disadvantage is that there are certain requirements for conductivity of the dust and humidity of the gas, otherwise a high dust removal rate cannot be obtained. In addition, non-recurring investment of this method is relatively high, and the operating cost is high.

With continuous improvement of the social level and continuous development of the economy, the demand for energy is also increasing. The main purpose of the coal gasification process is to improve the efficiency of coal use and provide more energy for production, for example, to convert coal into methanol or synthetic gas, thereby promoting the use of energy, or to synthesize ammonia and oil-gas mixtures from coal, thereby promoting the in-depth utilization of coalbed gas. The production process determines that the coal gasification crude synthesis gas contains a large amount of dust, which requires multi-stage dust removal treatment to achieve gas purification. However, the dust particles generated by the coal gasification process are very small, and a considerable amount of dust is between 0.1-1 μm in particle size. For particles less than 2 μm in particle diameter, customary dust removal process is very low in purification efficiency, and even cannot remove, so that a dust removal tank has to be installed in front of the synthesis gas conversion reactor, and fine dust is intercepted by fixed bed adsorption filtration. When the pores in the adsorption bed are filled, the pressure drop in the dust removal tank rises sharply, making the device unable to continue to operate. Stoppage/renovation not only affects the utilization of device capacity, but also increases material consumption and labor costs, affecting economic benefits.

SUMMARY OF THE INVENTION

One of the objectives of the invention is to provide a dust removal filler, so as to improve the problem of low removal efficiency or impossible removal of fine dust in gas by existing devices.

One of the objectives of the invention is to provide a fouling collection pan, which uses the adhesion and aggregation property of dust to construct a flow field and flow state suitable for dust adhesion and aggregation.

Another object of the invention is to provide a gas purification device to enable the dusty gas to be dedusted in stages, so that the dedusting effect is better.

In order to achieve the above objectives, according to the first aspect of the invention, the invention provides a dust removal filler, comprising:

a plurality of rows of channels, each channel extending obliquely with respect to a vertical direction to form a windward surface and a leeward surface; and a waveform plate, the peak portion of the waveform plate is attached to the leeward surface of the obliquely prismatic channel, during operation, dust adheres to a concave portion of a lower surface of the waveform plate and accumulates to form dust aggregates, when the gravity of the dust aggregates is greater than the adhesion force, the dust aggregates fall onto the windward surface of the channels and slide off from the windward surface of the channels.

Preferably, each channel is obliquely prismatic-shaped and has a rectangular cross-section, one pair of opposite sides extending obliquely relative to the vertical direction to form the windward surface and the leeward surface, and the other pair of opposite sides extending along the vertical direction, the obliquely prismatic channels in two adjacent rows are inclined in opposite directions.

Preferably, each row of obliquely prismatic channels is formed by a rectangular-wave plate and a partition plate to define flow channels therebetween.

Preferably, the rectangular-wave plate and the waveform plate are made by stamping, and the rectangular-wave plate and the waveform plate are metal plates.

Preferably, opening directions of two adjacent rectangular-wave plates are opposite.

Preferably, the inclination angle of the obliquely prismatic channel is greater than the angle of repose of the intercepted dust, and the inclination angle of the obliquely prismatic channel is 15°-75°.

Preferably, the width of the windward surface and the leeward surface is 2 mm-100 mm; the width of the sides extending along the vertical direction of the obliquely prismatic channel is 5 mm-200 mm.

Preferably, the wave amplitude of the waveform plate is 1 mm-100 mm; the wavelength is 20 mm-300 mm; the distance between the valley of the waveform plate and the windward surface of the adjacent obliquely prismatic channel is 2 mm-80 mm.

According to another aspect of the invention, there is provided a fouling collection pan comprising:

a column tray; and at least one fouling collection device arranged on the column tray, each fouling collection device includes a gas collection cartridge and a baffle plate arranged on the outer wall of the gas collection cartridge; the baffle plate is formed by multi-layer conical baffles, the conical baffle is composed of a conical plate and a waveform plate;

during operation, dust adheres to the concave portion of the lower surface of the waveform plate and accumulates to form dust aggregates, when the gravity of the dust aggregate is greater than the adhesion force, the dust aggregate falls onto the upper surface of the conical plate below or the column tray, and slide from the upper surface of the conical plate onto the column tray.

Preferably, the gas collection cartridge is a vertical cylindrical structure, the top end of the gas collection cartridge is closed, the lower end thereof is open, the lower end of the gas collection cartridge passes through the column tray and is connected with the column tray, and the outer wall of the gas collection cartridge is provided with a plurality of ventilation holes.

Preferably, the waveform of the waveform plate is a sine curve or a cosine curve, with an amplitude of 1 mm-80 mm and a wavelength of 30 mm-400 mm.

Preferably, the lower end of the gas collection cartridge vertically passes through the column tray and is connected with the column tray, and the ventilation hole is arranged on the cartridge wall between two adjacent layers of conical baffles.

Preferably, the cone angle of the baffle plate is 30-175°.

Preferably, the distance between two adjacent layers of conical baffles is 1.2 to 5 times the amplitude of the waveform plate.

Preferably, the column tray is provided with a plurality of fouling collection devices, and the plurality of fouling collection devices are evenly arranged on the column tray.

According to another aspect of the invention, there is provided a fouling collection pan comprising:

a column tray; and a fouling collection device arranged on the column tray, the fouling collection device includes a filter body, a baffle separation body and a cover plate;

the filter body is a sleeve annular columnar structure defining a fouling collection device axis;

the baffle separation body is a columnar structure of annular folded plates extending around the fouling collection device axis, formed of multi-layer annular folded plates, and the cross section of the annular folded plates is an inverted V shape, thereby forming an inverted V-shaped annular folded plate extending around the fouling collection device axis, the baffle separation body is sleeved outside of the filter body;

the cover plate is located above the baffle separation body and the filter body and covers the baffle separation body and the filter body, the top end of the baffle separation body is connected with the cover plate, and the bottom end of the baffle separation body is connected with the column tray;

during operation, dust adheres to the apex of inverted V-shape of the annular folded plate and accumulates to form dust aggregates, when the gravity of the dust aggregates is greater than the adhesion force, the dust aggregates falls onto the upper surface of the annular folded plate below or the column tray and slides off the upper surface of the annular folded plate onto the column tray.

Preferably, the lower end of the filter body passes through the column tray, and the filter body includes an inner cylinder, an outer cylinder and a fouling collection filling material arranged in an annular space between the inner cylinder and the outer cylinder.

Preferably, the thickness between the inner cylinder and the outer cylinder is 10 mm-500 mm, the inner cylinder and the outer cylinder are of the same height, are sleeved together and are made of a screen.

Preferably, the equivalent diameter of the fouling collection filling material is 0.1 mm-10 mm; the fouling collection filling material is of the shape of one or more of spherical, polygonal or triangular.

Preferably, the porosity of the filter body is 5-75%.

Preferably, the cone angle of the annular folded plates is 15°-150°; the distance between two adjacent annular folded plates is 3 mm-80 mm.

Preferably, the inclination angle of the annular folded plate is greater than the angle of repose of the solid substance in the gas.

Preferably, the cover plate is conical, frustoconical or straw hat.

Preferably, a gas flow channel is provided between the cover plate and the upper end of the filter body, so that the gas can flow therethrough after the filter body is clogged, and the width of the gas flow channel is 5 mm-120 mm.

According to another aspect of the invention, a gas purification device is provided, comprising an upper head, a lower head and a housing, at least one said fouling collection pan is arranged inside of the gas purification device.

Preferably, the fouling collection pan is arranged in the upper head and/or the housing, and when only one fouling collection pan is arranged, the fouling collection pan is arranged in the upper head.

Preferably, the gas purification device further comprises one or more layers of the dust removal filler, the gas purification device is provided with multi-layer fouling collection pans, and each layer of dust removal filler is arranged between two adjacent fouling collection pans.

Preferably, the gas purification device further comprises one or more protective agent beds, and the protective agent beds are arranged under the fouling collection pan.

Preferably, the protective agent bed is filled with a bird-nest protective agent, and the bird-nest protective agent includes a cartridge and a plurality of ribs, the plurality of ribs intersect each other to form a grid, and form an acute angle at the point of intersections.

Preferably, the inside of the gas purification device is provided with multi-layer fouling collection pans, and a protective agent bed or the dust removal filler is arranged between the two adjacent layers of fouling collection pans, and the dust removal filler is set above the protective agent bed, when three layers of fouling collection pans are installed, a first layer of fouling collection pan, a dust removal filler, a second layer of fouling collection pan, a protective agent bed and a third layer of fouling collection pan are in order according a gas flow direction.

Preferably, when multi-layer dust removal fillers are provided, the wave amplitude and wavelength of the waveform plates of the multi-layer dust removal fillers gradually decrease along the gas flow direction.

Preferably, when multi-layer fouling collection pans are provided, the dimension of the fouling collection pan arranged in the upper head is larger than the dimension of other fouling collection pans.

The dust removal filler, the fouling collection pan, the gas purification device and purification method provided by the invention have the following advantages:

According to the invention, the waveform plate of the dust removal filler can form a wave flow field and flow state in the obliquely prismatic channel, form a vortex flow field, and provide time and close distance for the adhesion of fine dust and the aggregation between dust, thereby separating the fine dust from the gas, when the gravity of the adhered aggregated dust cluster is greater than the adhesion force, it falls from the waveform plate and the windward surface of obliquely prismatic channel.

According to the invention, the rectangular-wave plate and the waveform plate of the dust-removing filler are stamped from metal plates, which can be applied to harsh conditions such as high temperature and high pressure.

According to the invention, by providing the fouling collection pan, the dust with larger particle size loses the suspension force due to the sudden drop of the gas velocity, and falls onto the column tray under the action of gravity; the columnar fouling collection pan rectifies the axial circular flow field of the gas into a horizontal flow field, which greatly increases the gas flow area, reduces the gas flow velocity, and provides sufficient adhesion and aggregation time for dust.

According to the invention, the inclination angle of the annular folded plate of the conical baffle in the fouling collection pan is greater than the angle of repose of the dust, and with the gradual growth of the dust aggregates, when the gravity is greater than the adhesion force, the dust will automatically fall onto the column tray, thereby possessing excellent self-cleaning function, preventing premature blockage and loss of dust removal function of dust removal assembly.

According to the invention, the fouling collection pan provides a large adhesion area and accumulating space for the solid substance in the gas by providing the baffle separation body composed of multi-layer annular folded plates, thereby increasing the adhesion probability of the solid substance. And the inclination angle of the annular folded plate of the fouling collection device is larger than the repose angle of dust. With the gradual growth of dust aggregates, when the gravity is greater than the adhesion force, the dust will automatically fall onto the column tray, thereby possessing excellent self-cleaning function, preventing premature blockage and loss of fouling collection function of the fouling collection device.

A plurality of fouling collection devices are arranged in the fouling collection pan of the invention, and the outer side thereof adopts an annular folded plate column structure. When the gas flows through the annular folded plate column, a multi-layer wave-shaped gas flow line is formed, and the gas forms a vortex at the turning point, and each layer of annular folded plates will form multiple vortex fields. The annular folded plate columns formed by multi-layer annular folded plates and multiple fouling collection devices will form a large number of vortex fields, which provide thermophoretic force for the adhesion and accumulation of solid substances in the gas. The solid substance breaks away from the flow line under the impact of gas molecules, and behaves like a Brownian motion of gas molecules. Due to the low flow velocity and the molecular force (Van Der Waals force) near the wall, the adhesion easily occurs between the powder particles and the annular folded plate. With the accumulation of dust, the volume increases. When the gravity is greater than the adhesion force, the dust aggregate will peel off from the annular folded plate and fall onto the column tray; as the dust accumulates on the upper surface of the annular folded plate, when the gravity is greater than the sliding resistance, the dust aggregates will slide off along the surface of the annular folded plate and fall onto the column tray, thus completing the interception and storage of dust.

According to the invention, the fouling collection pan, the dust removal filler and the bird-nest protective agent bed are provided, and the purification device is divided into different dust intercepting areas, so as to realize graded treatment of the dust in the process gas. On one hand, the fouling collection pan, dust removal filler and bird-nest protective agent bed can provide a larger adhesion area for dust; on the other hand, fine dust adheres and accumulates on the fouling collection pan, the dust removal filler and the bird-nest protective agent bed, thus realizing graded treatment of the dust, improving the dust interception efficiency and achieving the goal of capturing ultrafine dust in the gas.

According to the invention, a purification unit is arranged in the upper head, and the original idle device space is used for intercepting and storing dust, which greatly prolongs the life of the device.

According to the invention, the dust removal filler and the fouling collection pan have the same or similar operating principle: the ultrafine dust adheres to the corresponding concave portion of the lower surface of the dust removal filler structure or the fouling collection pan structure under the Van Der Waals force; accumulates under the action of Coulomb force to form dust aggregates; when the gravity of the dust aggregate is greater than the adhesion force, it falls onto the inclined surface below; the inclination angle of the inclined surface is greater than the angle of repose of the dust, and the dust aggregate slides down.

The gas purification device of the invention has simple structure and small pressure drop, can intercept and store fine dust in dusty gas, and is especially suitable for separating fly ash entrained in coal gasification crude synthesis gas.

DETAILED DESCRIPTION OF EMBODIMENTS

The specific situation of the invention will be further described below in conjunction with the accompanying drawings and specific embodiments, but is not limited to the following embodiments.

In the description of the invention, it should be noted that the orientation or positional relationship indicated by the terms "upper", "lower", "inner", "outer", "top", "bottom" etc. is based on the orientation or positional relationship, is only for the convenience of describing the invention and simplifying the description, but does not indicate or imply that the referred device or element must have a specific orientation, be constructed and operated in a specific orientation, and thus should not be construed as a limitation of the invention. In addition, the terms "first" and "second" are used for descriptive purposes only, and should not be understood as indicating or implying relative importance.

In the description of the invention, it should be noted that, unless otherwise clearly specified and defined, the terms "provided with", "arranged at", "connected with", "connected to", "installed to", etc. should be understood in a broad sense, for example, they can be a fixed connection, a detachable connection, or an integral connection; they can be a direct connection, or an indirect connection through an intermediate media, or an internal communication between two components. Those of ordinary skill in the art can understand the specific meanings of the above terms in the invention in specific situations.

Figure 1:
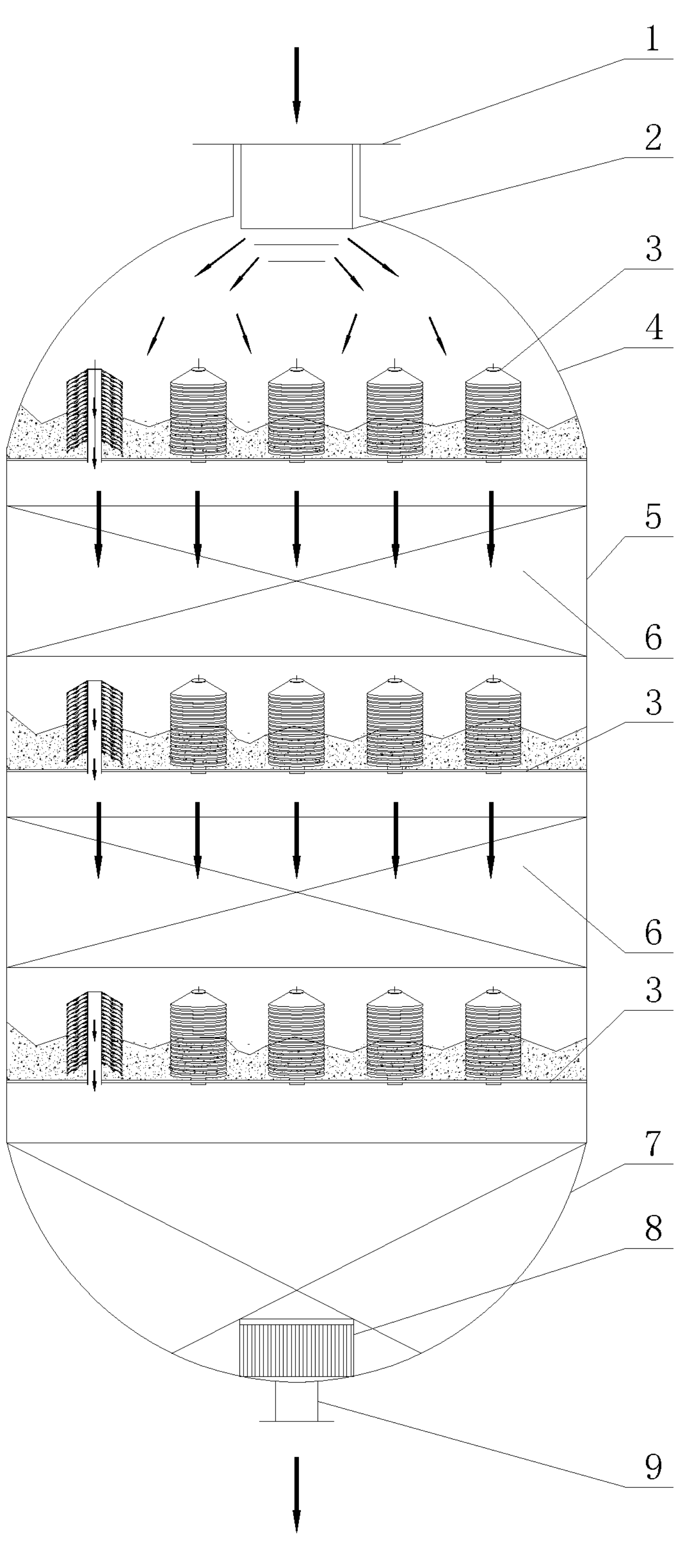
FIG. 1 is a structural schematic view of a gas purification device according to a first embodiment of the invention.

FIG. 1 is a structural schematic view of a gas purification device according to a first embodiment of the invention. As shown in FIG. 1, the invention provides a gas purification device, which includes an upper head 4, a housing 5 and a lower head 7. The upper head is provided with a gas inlet 1, below which an inlet diffuser 2 may also be arranged. The lower head is provided with a gas outlet 9, above which an outlet collector 8 is arranged. A fouling collection pan 3 is arranged inside the gas purification device, and the fouling collection pan 3 is arranged in the upper head 4 and/or in the housing 5. Preferably, the uppermost fouling collection pan 3 is arranged in the upper head 4, and the dimension of the fouling collection pan 3 arranged in the upper head 4 is larger than the dimension of other fouling collection pans 3 arranged in the housing. A dust removal filler 6 is arranged below the fouling collection pan 3. Preferably, the dust-removing filler is arranged between two layers of fouling collection pans 3.

Figure 2:
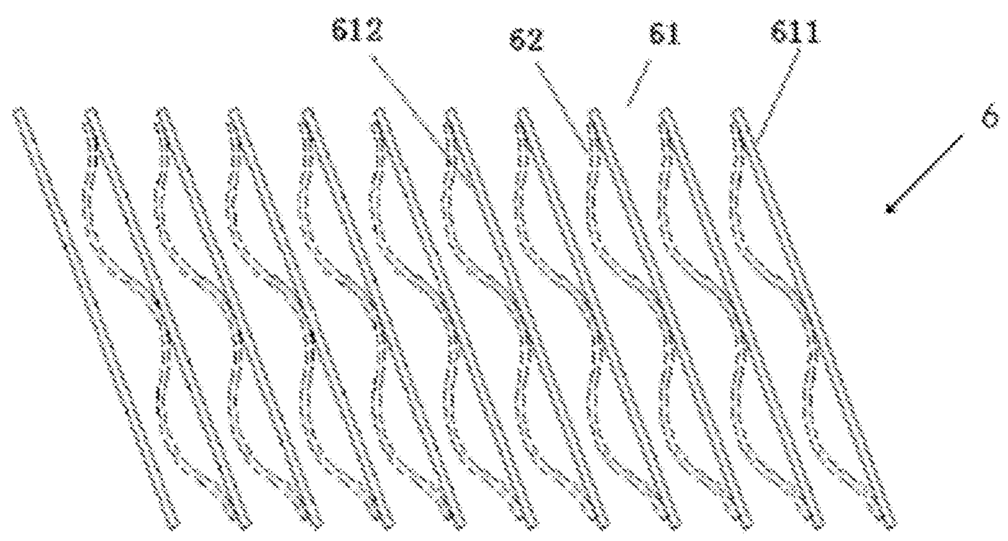
FIG. 2 is a structural schematic view of the dust removal filler of the gas purification device shown in FIG. 1.
Figure 3:
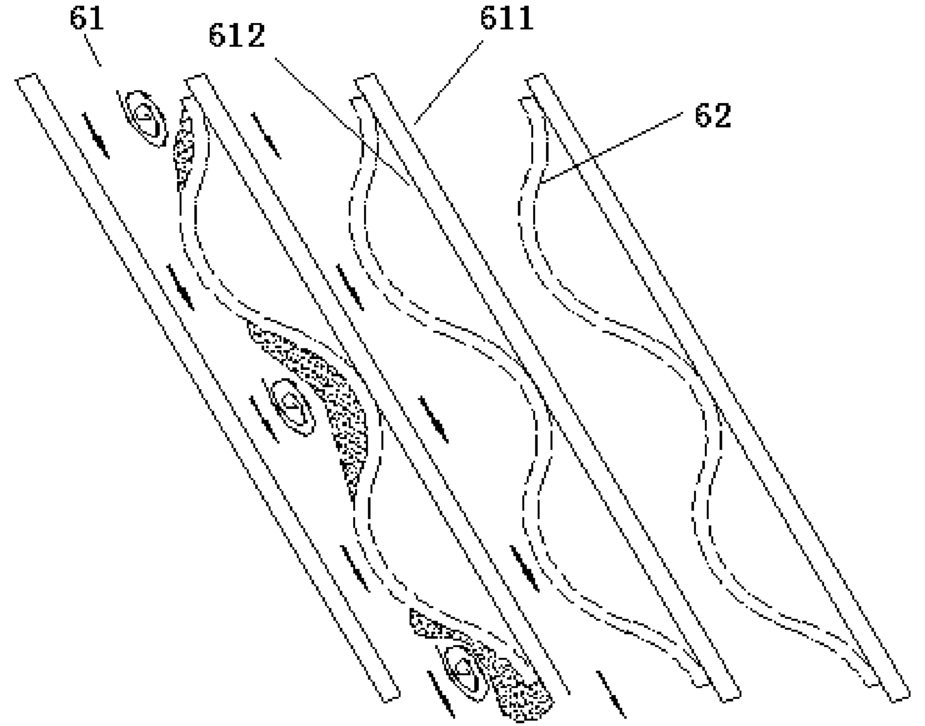
FIG. 3 is a partially enlarged view of the dust removal filler shown in FIG. 2.
Figure 4:
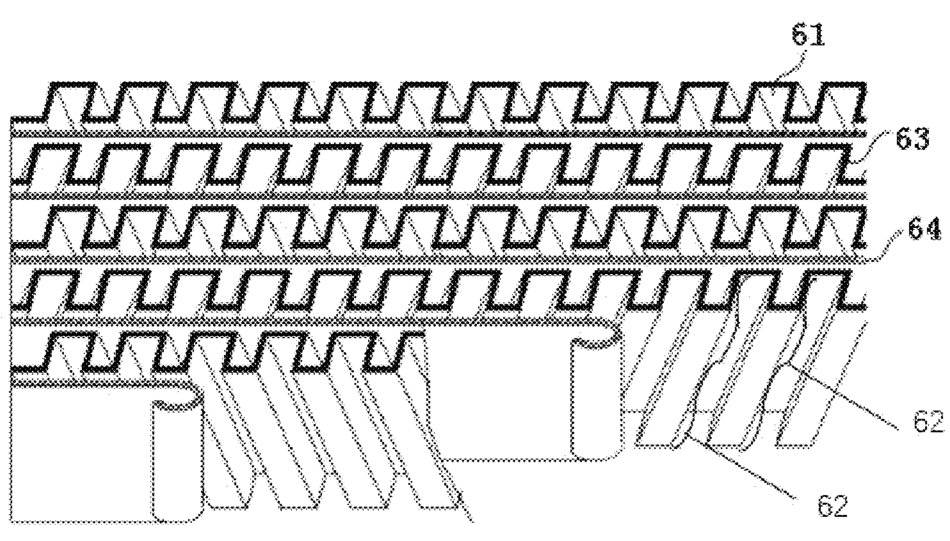
FIG. 4 is a partial structural schematic view of the obliquely prismatic channel of the dust removal filler, where the waveform plate is not shown.

FIG. 2 is a structural schematic view of the dust removal filler of the gas purification device shown in FIG. 1. FIG. 3 is a partially enlarged view of the dust removal filler shown in FIG. 2. FIG. 4 is a partial structural schematic view of the obliquely prismatic channel of the dust removal filler, wherein the waveform plate is not shown. As shown in FIG. 2 to FIG. 4, the dust removal filler 6 according to the specific embodiment of the invention includes multiple rows of channels 61, and each channel 61 extends obliquely relative to a vertical direction to form a windward surface 611 and a leeward surface 612. In the illustrated embodiment, each channel 61 is obliquely prismatic shaped, and the cross-section thereof is rectangular. One pair of opposite sides are inclined relative to the vertical direction to form the windward surface 611 and the leeward surface 612, and the other pair of opposite sides extend along the vertical direction. It should be understood that the channel 61 may adopt other shapes as long as the channel 61 extends obliquely relative to the vertical direction to form a windward surface and a leeward surface. According to a preferred embodiment, the inclination directions of the obliquely prismatic channels 61 in two adjacent rows are opposite (as shown in FIG. 4). The peak portions of the waveform plate 62 are attached to the leeward surface 612 of the obliquely prismatic channel 61. The peak portions of the waveform plate 62 can be attached to the leeward surface 612 of the obliquely prismatic channel 61 in any suitable manner, including but not limited to by welding.

When the gas flows from top to bottom, it only flows through the area between the waveform plate 62 and the windward surface 611, and does not flow into the area between the waveform plate 62 and the leeward surface 612. The gas entrained with fine dust enters the dust removal filler 6. When the gas flows through the dust removal filler 6, under the action of the waveform plate 62, a vortex is generated, which provides time and close distance for the adhesion of ultrafine dust and aggregation between dust. The ultrafine dust adheres to the waveform plate 62 under the action of Van Der Waals force, and the ultrafine dust accumulates at the concave portion of the lower surface of the waveform plate 62 under the action of Coulomb force to form aggregates (ash clusters). When the gravity of the aggregates (ash clusters) is greater than the adhesion force, it falls onto the windward surface 611 of the obliquely prismatic channel 61 of the dust removal filler 6. The windward surface 611 has a certain inclination angle, and the inclination angle is greater than the angle of sliding repose of the dust, and the ash clusters will slide off.

As shown in FIG. 2, in one or more embodiments of the invention, each row of obliquely prismatic channels 61 is formed by a rectangular-wave plate 63 and a partition plate 64 to define flow channels therebetween. In one or more exemplary embodiments of the invention, both the rectangular-wave plate 63 and the waveform plate 62 are made of metal plates by stamping, so as to be able to apply to the working environment of high temperature and high pressure. In one or more exemplary embodiments of the invention, the opening directions of two adjacent rectangular-wave plates 63 are opposite. It should be understood that the invention is not limited thereto, and those skilled in the art can select the material and manufacturing method of the obliquely prismatic channel according to actual needs, for example, non-metallic materials such as plastics, or other metal materials with good ductility such as aluminum, etc. are used under normal temperature and normal pressure conditions. Forming methods can utilize molding. The rectangular-wave plate 63 and the waveform plate 62 can be connected in any suitable way, including but not limited to by welding and the like.

Further, in one or more exemplary embodiments of the invention, the inclination angle of the obliquely prismatic channel 61 is greater than the angle of repose of the intercepted dust. The inclination angle of the obliquely prismatic channel 61 may be 15°-75°, preferably may be 30°-60°. The inclination angle of the obliquely prismatic channel 61 is defined as the included angle (acute angle) of the obliquely prismatic channel 61 relative to the horizontal plane. It should be understood that the invention is not limited thereto, and the inclination angle of the obliquely prismatic channel 61 can be set according to the angle of repose of the intercepted dust.

Further, in one or more exemplary embodiments of the invention, the width of the windward surface 611 and the leeward surface 612 is 2 mm-100 mm, preferably 5 mm-30 mm; the width of the sides extending along the vertical direction of the obliquely prismatic channel is 5 mm-200 mm, preferably 20 mm-80 mm. Further, in one or more exemplary embodiments of the invention, the wave amplitude of the waveform plate 62 is 1 mm-100 mm, preferably 3 mm-60 mm; the wavelength is 20 mm-300 mm, preferably 30 mm-220 mm; the distance from wave valley of the waveform plate 62 to the windward surface 611 of the adjacent obliquely prismatic channel is 2 mm-80 mm, preferably 5 mm-30 mm.

Further, when the multi-layer dust removal filler 6 is installed, the wave amplitude and wavelength of the waveform plates 62 of the multi-layer dust removal filler 6 gradually decrease along the flow direction of the gas material, so as to meet the requirement of gradual reduction of dust particle size.

Figure 5:
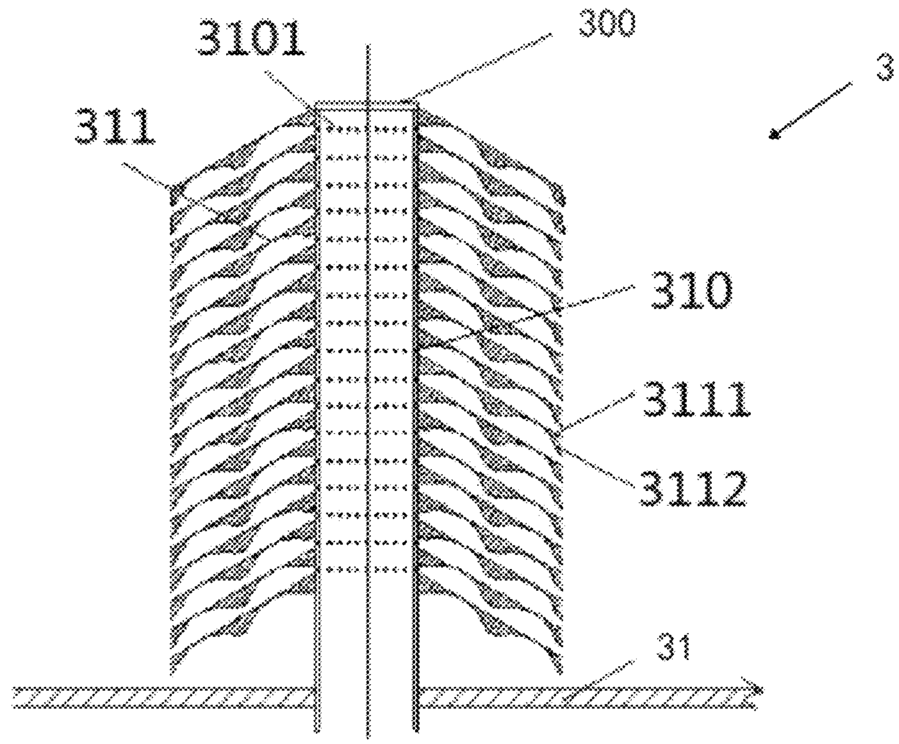
FIG. 5 is a schematic view of a fouling collection pan according to a first embodiment of the invention.
Figure 6:
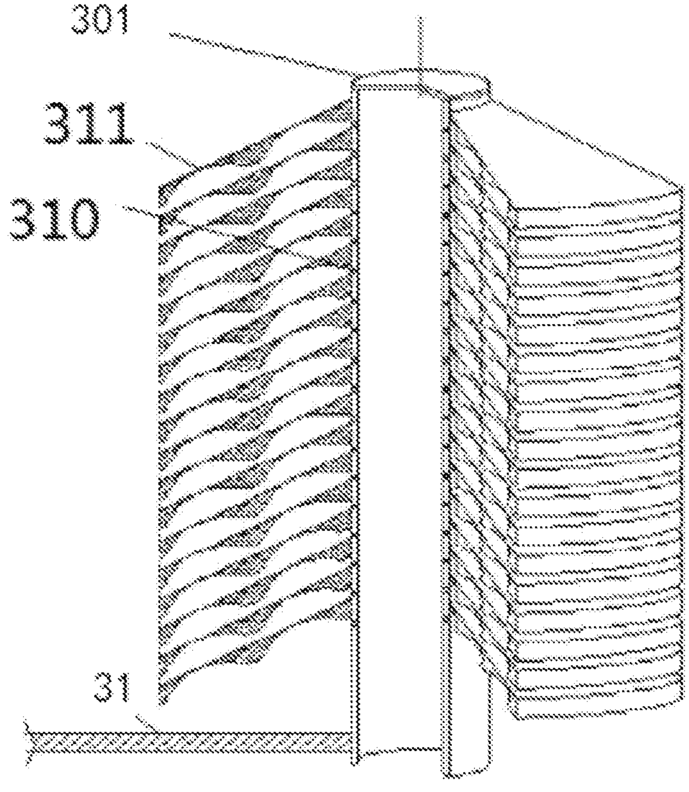
FIG. 6 is a schematic view of the appearance and structure of the fouling collection pan shown in FIG. 5.
Figure 7:
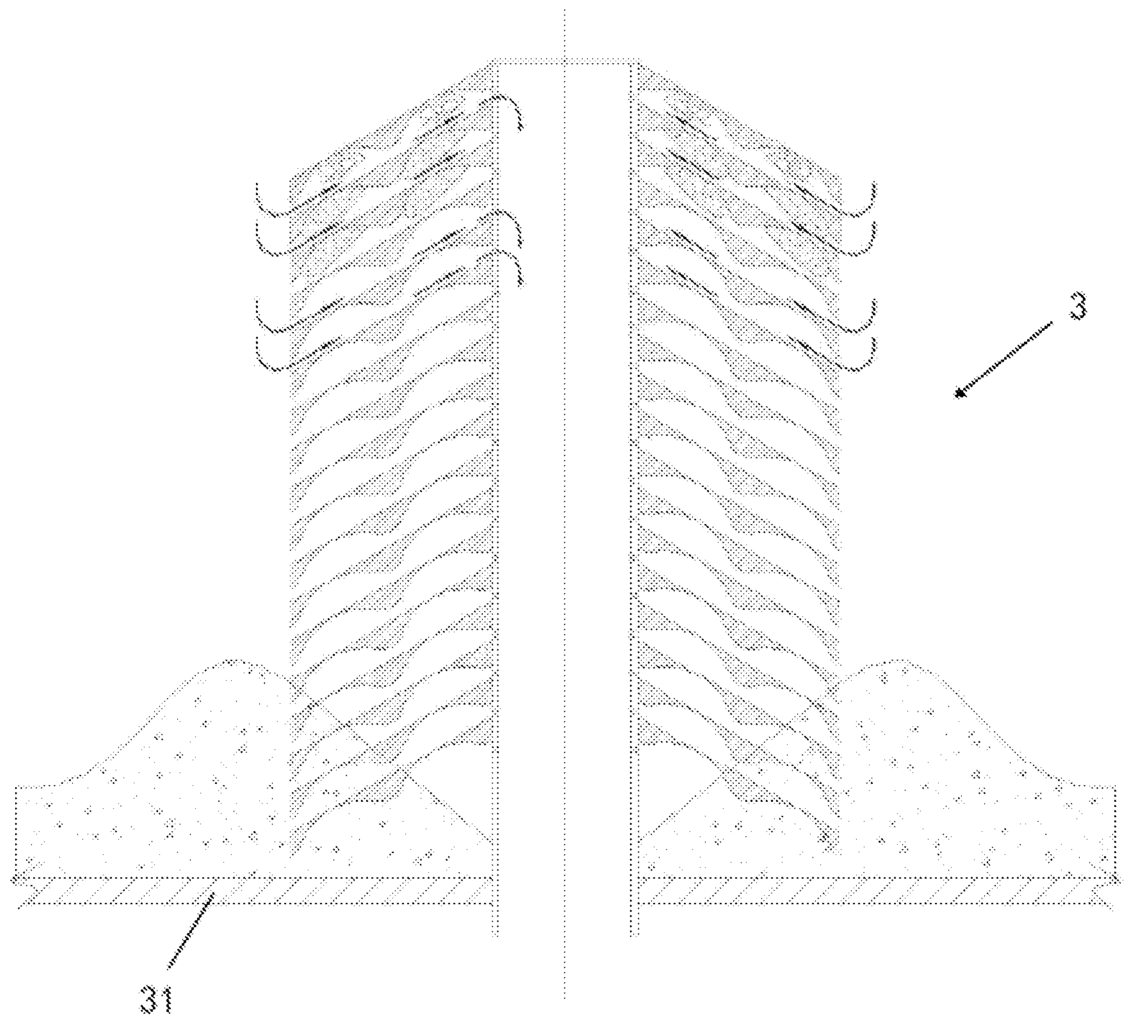
FIG. 7 is a schematic view of the flow field and flow state of the fouling collection pan shown in FIG. 5.

FIG. 5 is a structural schematic view of a fouling collection pan according to a first embodiment of the invention. FIG. 6 is a schematic view of the appearance and structure of the fouling collection pan shown in FIG. 5. FIG. 7 is a schematic view of the flow field and flow state of the fouling collection pan shown in FIG. 5. As shown in FIG. 5-FIG. 7, the invention provides a fouling collection pan, which includes a column tray 31 and a fouling collection device 300 arranged on the column tray. The fouling collection device 300 includes a gas collection cartridge 310 and a baffle plate 311 arranged on the outer wall of the gas collection cartridge.

In the above fouling collection pan, the baffle plate 311 is formed by a multi-layer conical baffle, and the conical baffle is composed of a conical plate 3111 and a waveform plate 3112; wherein the waveform of the waveform plate 3112 is a sine curve or cosine curve, the amplitude is 1 mm-80 mm, preferably 3 mm-40 mm; the wavelength is 30 mm-400 mm, preferably 80 mm-150 mm. The peak portions of the waveform plate 3112 are attached to the lower surface of the tapered plate 3111. The waveform plate 3112 and the conical plate 3111 can be connected in any suitable way, including but not limited to by welding.

In the above fouling collection pan, the gas collection cartridge 310 is a vertical cylindrical structure. The top end of gas collection cartridge 310 is closed, and the lower end thereof is open. The lower end of gas collection cartridge 310 passes through the column tray 31 and is connected with the column tray 31. Preferably, the gas collection cartridge 310 vertically passes through the column tray 31, and the outer wall of gas collection cartridge 310 is provided with a plurality of ventilation holes 3101, which are used as gas feed ports. The opening positions of the ventilation holes 3101 can be specifically arranged on the cartridge wall between two adjacent layers of conical baffles. The gas collection cartridge 310 is used as a gas flow channel.

In the above fouling collection pan, the cone angle of the baffle plate 311 is 30°-175°, preferably 90°-110°; the distance between two adjacent layers of conical baffles is 1.2-5 times the amplitude of the waveform plate, preferably 1.5-3 times the amplitude of the waveform plate, more preferably 1.8-2.5 times the amplitude of the waveform plate. In the invention, the cone angle of the baffle plate 311 is defined as the apex angle of a isosceles triangle obtained by extending the cross-sectional profile of each baffle plate 311 in the cross-sectional view shown in FIG. 7, and the inclination angle of the baffle plate 311 is defined as the base angle of the isosceles triangle.

In the above fouling collection pan, the column tray 31 is provided with a plurality of fouling collection devices 300, and the specific number of fouling collection devices can be determined by those skilled in the art according to actual needs. When more than two fouling collection devices are arranged, a plurality of fouling collection devices are evenly arranged on the column tray, such as but not limited to: in square arrangement, in regular triangle arrangement, in circular arrangement, etc.

By means of the fouling collection pan, the gas flowing therethrough is blocked and limited to achieve a restricted even flow; when the gas flows through the conical baffle, a multi-layer wave-shaped gas flow line is formed, and the gas forms a vortex at the turning point, and the dust is separated from the flow line under the impact of the gas molecule and performs Brownian motion like gas molecules. Due to the low flow velocity and the molecular force (Van der Waals force) near the wall, the adhesion phenomenon occurs very easily between the powder particles and the conical baffle, thereby forming dust aggregates; with the accumulation of dust, the volume increases. When the gravity of the dust aggregate is greater than the adhesion force, the dust aggregate will peel off from the conical baffle and fall onto the next layer of conical baffle below, or will directly fall onto the column tray 31 if it is the lowest layer of conical baffles. The conical baffle is composed of a conical plate and a waveform plate, the upper surface of the conical plate is a smooth inclined plate, and the inclination angle thereof is greater than the angle of repose of the dust. With the accumulation of dust on the upper surface of the conical plate, when the gravity of the dust aggregate is greater than the sliding resistance, the dust aggregate will slide off along the surface of the conical plate and fall onto the column tray, thus completing the interception and storage of dust. The low flow velocity at the gas vortex facilitates the electrostatic force (Coulomb force) to play a role, and the dust will accumulate and agglomerate to form aggregates. When the dust aggregates are large enough, the thermophoretic force of the gas is not enough to suspend and entrain the dust particles, causing the deposition of dust particles.

Figure 8:
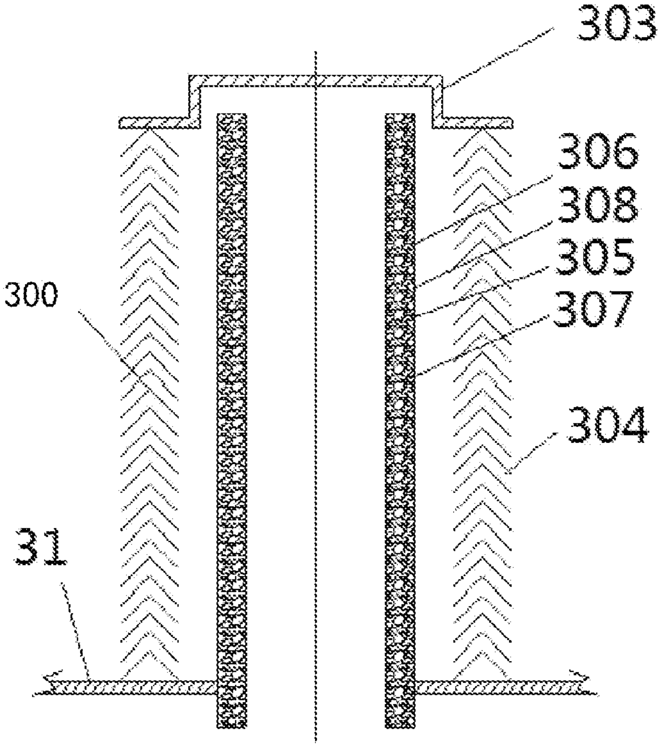
FIG. 8 is a structural schematic view of a fouling collection pan according to a second embodiment of the invention.
Figure 9:
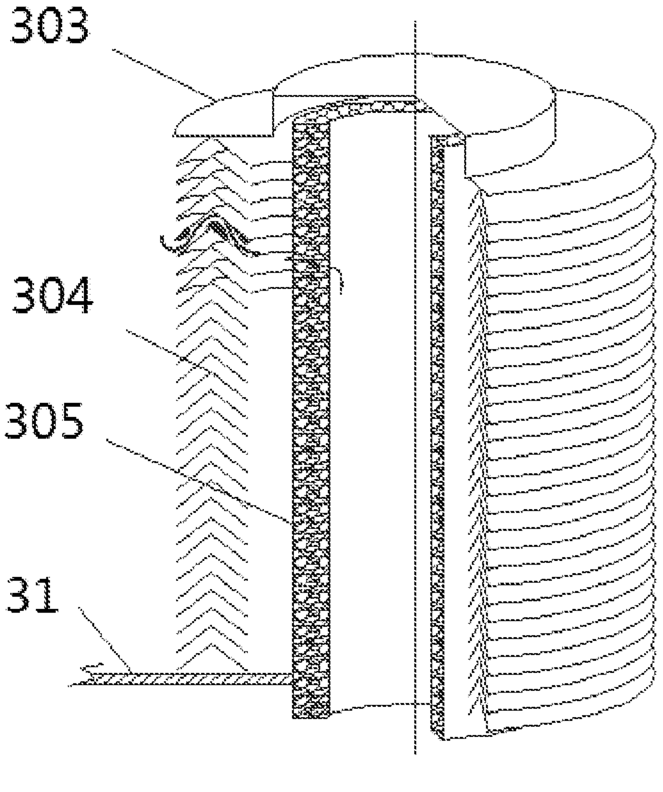
FIG. 9 is a schematic view of the appearance and structure of the fouling collection pan shown in FIG. 8.
Figure 10:
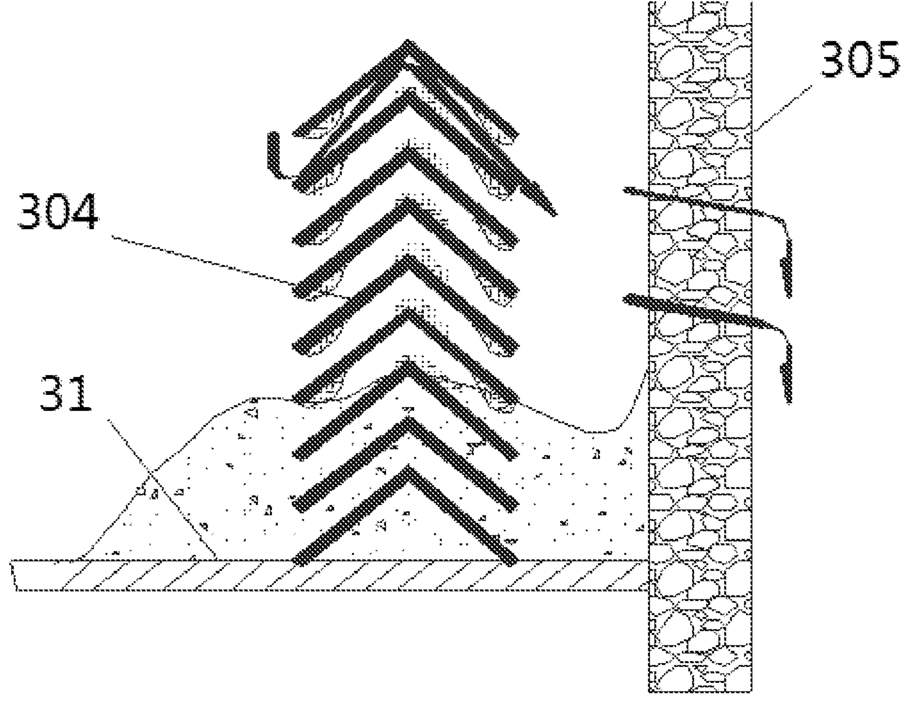
FIG. 10 is a schematic view of the flow field and flow state of the fouling collection pan shown in FIG. 8.

FIG. 8 is a structural schematic view of a fouling collection pan according to a second embodiment of the invention. FIG. 9 is a schematic view of the appearance and structure of the fouling collection pan shown in FIG. 8. FIG. 10 is a schematic view of the flow field and flow state of the fouling collection pan shown in FIG. 8. As shown in FIG. 8-FIG. 10, the invention provides a fouling collection pan. The fouling collection pan 3 includes a column tray 31 and a plurality of fouling collection devices 30 arranged on the column tray. The plurality of fouling collection devices 30 are evenly arranged on the column tray 31, and specifically can be arranged in a square arrangement, in an equilateral triangle arrangement, or the like.

The fouling collection device 30 includes a cover plate 303, a baffle separation body 304 and a filter body 305 passing through the column tray; the cover plate 303 is located above the baffle separation body 304 and the filter body 305 and covers the baffle separation body 304 and the filter body 305, so as to ensure that the gas material enters the fouling collection device through the baffle separation body 304, the top end of the baffle separation body 304 is connected to the cover plate 303, and the bottom end of the baffle separation body 304 is fixed on the column tray 301; the baffle separation body 304 is coaxially sleeved outside of the filter body 305, and there is a certain distance between the baffle separation body 304 and the filter body 305, which annular space can be used to store the captured solid substance; that is, in the contact order of the gas material, the gas at first passes through the baffle separator 304, and then passes through the filter body 305.

The baffle separation body 304 is a columnar structure of annular folded plates, formed by stacking a plurality of inverted V-shaped annular folded plates, and the annular folded plates can be fixed by using, for example but not limited to, multiple columns or an annular frame (not shown). The cone angle of the inverted V-shaped annular folded plate is 15°-150°, preferably 30°-90°; the distance between two adjacent annular folded plates is 3 mm-80 mm, preferably 8 mm-28 mm. The inclination angle of the annular folded plate is greater than the angle of repose of the solid substance in the gas, doing so can accelerate sliding along the surface of the folded plates for particle aggregates of solid substance. In the invention, the cone angle of the annular folded plate is defined as the apex angle of the isosceles triangle obtained by extending the section profile of each annular folded plate in the cross-sectional view shown in FIG. 10, and the inclination angle of the annular folded plate is defined as the base angle of the isosceles triangle.

The filter body 305 is a sleeve annular columnar structure, the lower end of the filter body 305 passes through the column tray 31, and the filter body 305 includes an inner cylinder 307, an outer cylinder 308 and a fouling collection filling material 306 arranged in the annular space between the inner cylinder and the outer cylinder, the filter body 305 is annular columnar; the width between the inner cylinder 307 and the outer cylinder 308 is 10 mm-500 mm, preferably 100 mm-300 mm; further preferably the inner cylinder 307 and the outer cylinder 308 is of the same height, and are sleeved together and are made of screen; the inner cylinder 307 passes through the column tray 301 and is used as a gas channel; the annular columnar filter body has a suitable porosity.

There is a certain gap between the cover plate 303 and the upper end of the filter body 305, and this gap can be used as a gas flow channel after the filter body 305 is blocked. The height of the gap is 5 mm-200 mm, preferably 20 mm-120 mm. When sufficient solid substance is intercepted or even submerges the fouling collection device, the fouling collection pan loses the function of intercepting dust, but the space between the cover plate 303 and the upper end of the filter body 305 can still be used as a gas material channel, thereby not generating pressure drop and keeping the device running stably for a long period of time. Further, in one or more exemplary embodiments of the invention, the cover plate 303 may be in the shape of a cone, a truncated cone or a straw hat. It should be understood that the cover plate 303 shown in the drawings is a straw hat shape, but the invention is not limited thereto.

Further, in one or more exemplary embodiments of the invention, the dimension of the fouling collection pan 3 disposed in the upper head 4 is larger than the dimension of other fouling collection pans 3.

Further, in one or more exemplary embodiments of the invention, when the protective agent bed is multi-layered, the porosity of the multi-layer protective agent bed 6 gradually decreases in the gas material flow direction.

By means of the fouling collection pan, the gas flowing therethrough is blocked and limited to achieve a restricted even flow; when the gas flows through the inverted V-shaped annular folded plate, the gas forms a vortex at the turning point, and the dust is separated from the flow line under the impact of the gas molecule and performs Brownian motion like gas molecules. Due to the low flow velocity and the molecular force (Van Der Waals force) near the wall, the adhesion phenomenon occurs very easily between the powder particles and the annular folded plate, thereby forming dust aggregates; with the accumulation of dust, the volume increases. When the gravity of the dust aggregate is greater than the adhesion force, the dust aggregate will peel off from the annular folded plate and fall onto the next layer of annular folded plate below, or will directly fall onto the column tray 31 if it is the lowest layer of annular folded plates. The upper surface of the annular folded plate is a smooth inclined plate, and the inclination angle thereof is greater than the angle of repose of the dust. With the accumulation of dust on the upper surface of the annular folded plate, when the gravity of the dust aggregate is greater than the sliding resistance, the dust aggregate will slide off along the surface of the conical plate and fall onto the column tray, thus completing the interception and storage of dust. The low flow velocity at the gas vortex facilitates the electrostatic force (Coulomb force) to play a role, and the dust will accumulate and agglomerate to form aggregates. When the dust aggregates are large enough, the thermophoretic force of the gas is not enough to suspend and entrain the dust particles, causing the deposition of dust particles.

Figure 11:
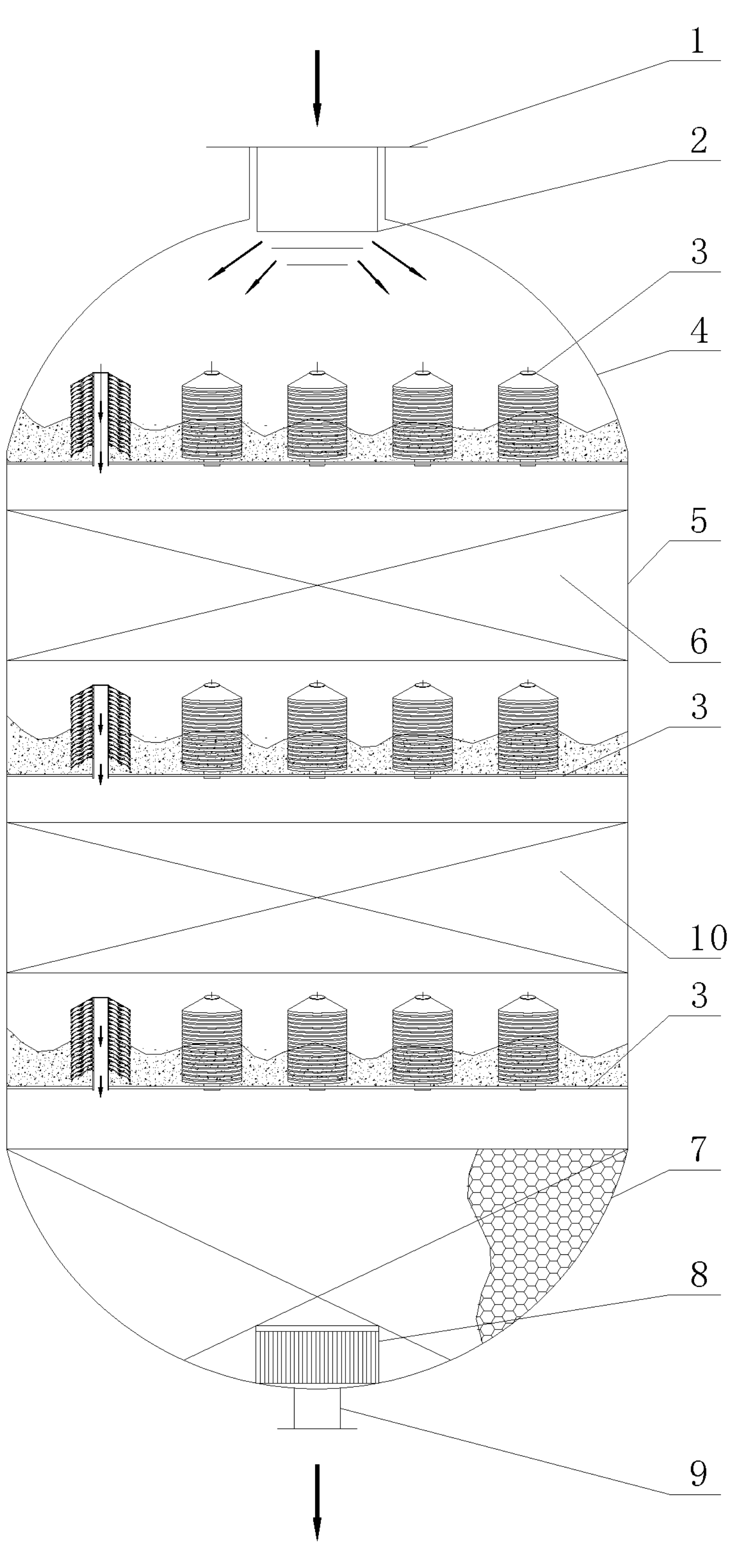
FIG. 11 is a structural schematic view of a gas purification device according to a second embodiment of the invention.
Figure 13:
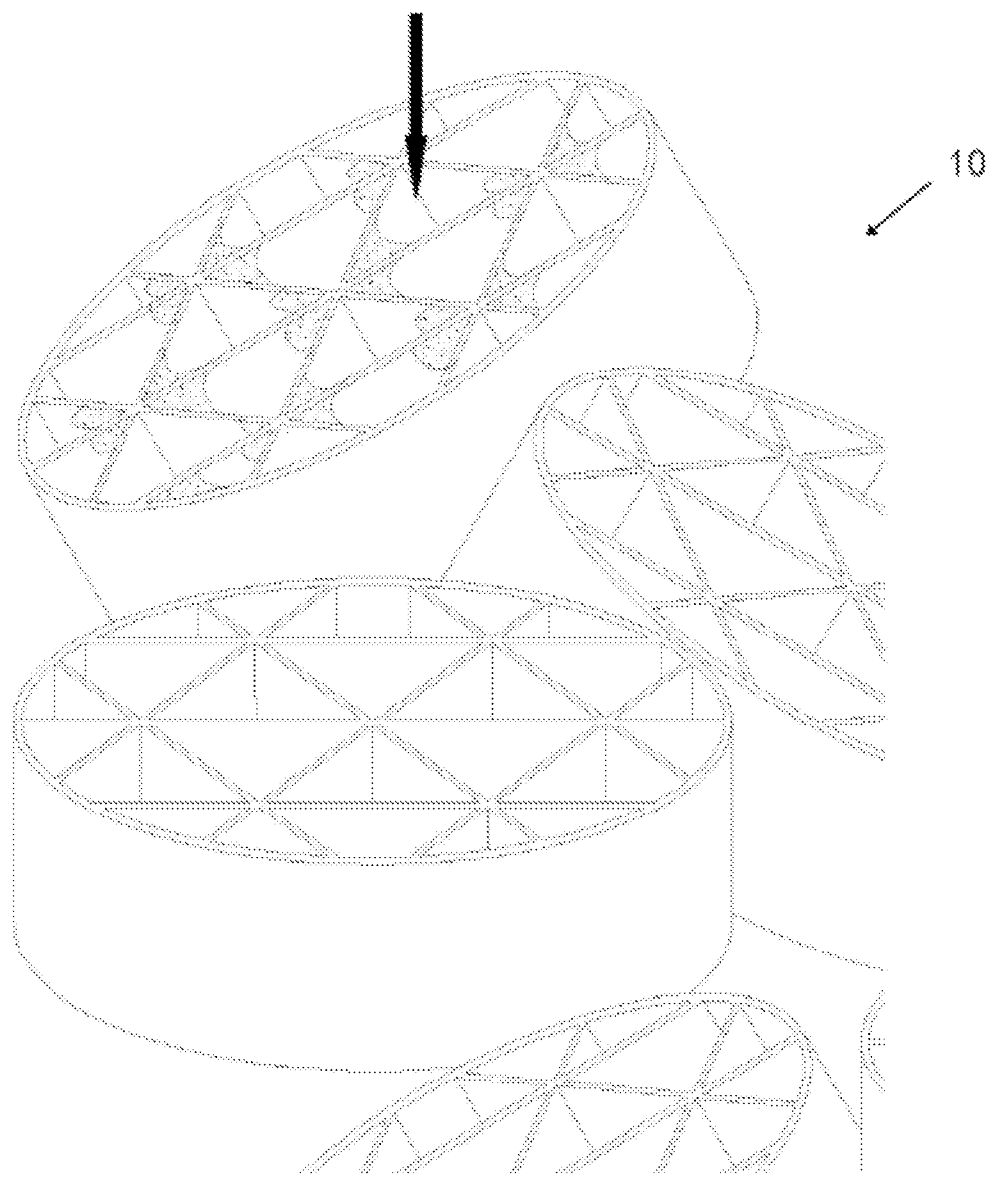
FIG. 13 is a structural schematic view of a bird-nest filler.

FIG. 11 is a structural schematic view of a gas purification device according to a second embodiment of the invention. As shown in FIG. 11, the invention provides the gas purification device of the second embodiment, the device includes an upper head 4, a housing 5 and a lower head 7; the upper head is provided with a gas inlet 1, below which an inlet diffuser 2 may also be arranged. The lower head is provided with a gas outlet 9, above which an outlet collector 8 is arranged; the interior of the device is provided with multi-layer fouling collection pans 3 as described above, a dust removal filler 6 and a protective agent bed 10, the dust removal filler 6 or the protective agent bed 10 is arranged between the two adjacent layers of fouling collection pans 3, and the dust removal filler 6 is arranged above the protective agent bed 10. Specifically, when three layers of fouling collection pans, the dust removal filler, and the protective agent bed are provided, a first layer of fouling collection pan, the dust removal filler, a second layer of fouling collection pan, the protective agent bed and a third layer of fouling collection pan are in order according a gas flow direction. The fouling collection pans 3 are arranged in the upper head 4 and/or in the housing 5, preferably arranged in the upper head 4, and the dimension of the fouling collection pan 3 arranged in the upper head 4 is larger than the dimension of other fouling collection pan(s) 3 arranged in the housing. The protective agent bed 10 is filled with bird-nest structure protective agent, as shown in FIG. 13, the bird-nest filler is composed of a cartridge and a plurality of ribs, the plurality of ribs intersect each other to form a grid, and form an acute angle at the point of intersections.

Figure 12:
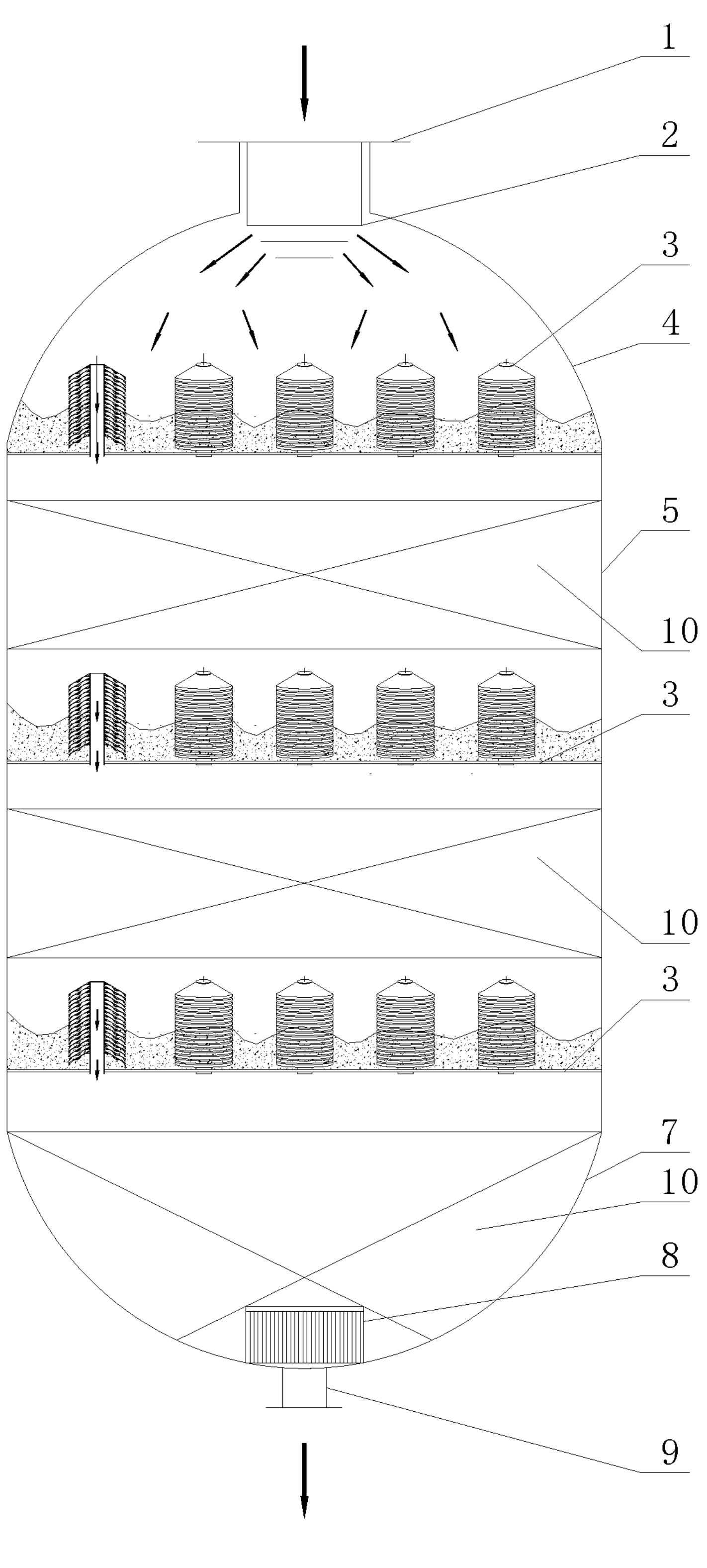
FIG. 12 is a structural schematic view of a gas purification device according to a third embodiment of the invention.

FIG. 12 is a structural schematic view of a gas purification device according to a third embodiment of the invention. FIG. 13 is a structural schematic view of a bird-nest filler. As shown in FIG. 12, the invention provides the gas purification device of the third embodiment, and said device comprises an upper head 4, a housing 5 and a lower head 7; the upper head is provided with a gas inlet 1, below which an inlet diffuser 2 may also be arranged. The lower head is provided with a gas outlet 9, above which an outlet collector 8 is arranged; the interior of the device is provided with fouling collection pans 3. The fouling collection pans 3 are arranged in the upper head 4 and/or in the housing 5, preferably arranged in the upper head 4, and the dimension of the fouling collection pan 3 arranged in the upper head 4 is larger than the dimension of other fouling collection pan(s) 3 arranged in the housing. A protective agent bed is arranged below the fouling collection pan 3, and it is further preferred that the protective agent bed 10 is disposed between two layers of fouling collection pans 3. The protective agent bed 10 is filled with bird-nest structure protective agent, as shown in FIG. 13, the bird-nest filler is composed of a cartridge and a plurality of ribs, the plurality of ribs intersect each other to form a grid, and form an acute angle at the point of intersections.

The dusty gas after being treated by the fouling collection pan and dust removal filler enters the protective agent bed, which has the function of "filtering", can further intercept and store the solid substance in the gas. When the bird-nest structure protective agent bed is used, dust has bridging properties, and a bridging effect is formed at the acute angle formed by the intersection of the ribs of the bird-nest protective agent to realize the deposition of dust; as the operation cycle advances, the dust adheres and bridges under the action of Van Der Waals force, and accumulates under the action of Coulomb force; fine dust clusters grow up, and when the ash clusters fall off, they are pushed by the gas. A fouling collection pan is arranged under the bird-nest protective agent bed to provide a low flow velocity condition for the ash clusters, and to form a stagnant layer above the fouling collection pan, which is beneficial for the interception and storage of dust ash clusters, thereby realizing the separation of fine dust particles. Providing different specifications of bird-nest protective agent beds will deeply separate the ultrafine dust. The purified gas flows out from the outlet collector and gas outlet arranged on the lower head, and the dust removal and purification process of the gas is completed so far.

The preferred embodiments of the invention have been described in detail above with reference to the accompanying drawings, however, the invention is not limited thereto. Within the scope of the technical concept of the invention, various simple modifications can be made to the technical solution of the invention, including combinations of specific technical features in any suitable manner. In order to avoid unnecessary repetition, various possible combinations are not further described in the invention. However, these simple modifications and combinations should also be regarded as the content disclosed by the invention, and all belong to the protection scope of the invention.

The invention claimed is:

1. A dust removal filler, comprising:

a plurality of wave plates (63) and a plurality of partition plates (64) alternately stacked to form a plurality of rows of flow channels (61) wherein:

each row of flow channels is formed by a wave plate attached to one of the plurality of partition plates, each flow channel (61) extends obliquely with respect to a vertical direction and has a windward surface (611) and a leeward surface (612), and each flow channel has disposed therein a waveform plate (62) having a peak portion attached to the leeward surface (612) thereof, wherein the waveform plate divides the flow channel to a flow passage between the waveform plate and the windward surface and a closed space between the wave plate (62) and the leeward surface, the dust removal filler is configured such that during operation:

in each flow channel, a gas stream containing dust flows through the flow passage without entering the closed space, wherein dust is separated from the gas stream and adheres to a concave portion of a lower surface of the waveform plate (62) under the action of Van Der Waals force;

dust accumulates under the action of Coulomb force to form dust aggregates;

when the gravity of the dust aggregates is greater than the adhesion force thereof, the dust aggregates fall onto the windward surface (611) of the flow channel (61) and slide downward along the windward surface (611).

2. The dust removal filler according to claim 1, wherein flow channels (61) in two adjacent rows separated by a partition place are oriented in two different directions.

3. The dust removal filler according to claim 1, wherein each wave plate (63) is a rectangular-wave plate.

4. The dust removal filler according to claim 1, wherein an inclination angle of the flow channels (61) is greater than the angle of repose of the intercepted dust.

5. A gas purification device, comprising:

a body comprising a housing (5), an upper head (4) connected to an upper end of the housing, and a lower head (7) connected to a lower end of the housing;

a plurality of fouling collection pans (3) arranged in the upper head (4) and the housing (5); and one or more dust removal fillers according to claim 1, each of the one or more dust removal fillers is disposed in a space between two adjacent fouling collection pans (3).

* * * * *